US012695656B2

(12) United States Patent
Singh et al.

(10) Patent No.: US 12,695,656 B2
(45) Date of Patent: Jul. 28, 2026

(54) FAST FOURIER TRANSFORM DATA COMPRESSION FOR VIBRATION APPLICATIONS

(71) Applicant: Honeywell International Inc., Charlotte, NC (US)

(72) Inventors: Sarabjit Singh, Hyderabad (IN); Ram Mohan Anugu, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 130 days.

(21) Appl. No.: 18/649,565

(22) Filed: Apr. 29, 2024

(65) Prior Publication Data

US 2025/0337628 A1     Oct. 30, 2025

(51) Int. Cl.
H04L 27/26          (2006.01)
G01S 7/295          (2006.01)
(52) U.S. Cl.
CPC ............ H04L 27/265 (2013.01); G01S 7/295 (2013.01)
(58) Field of Classification Search
CPC .... H04L 27/265; G01S 7/295; H03M 7/4006; H03M 7/3068; H03M 7/70; H03M 7/3059
See application file for complete search history.

(56) References Cited

U.S. PATENT DOCUMENTS

| | | | |
|---|---|---|---|
| 5,309,232 A | 5/1994 | Hartung et al. | |
| 8,045,614 B2 | 10/2011 | Gish et al. | |
| 8,638,845 B2 | 1/2014 | Hatakawa et al. | |

(Continued)

FOREIGN PATENT DOCUMENTS

| | | |
|---|---|---|
| CN | 101944235 B | 2/2012 |
| CN | 103489450 A | 1/2014 |

(Continued)

OTHER PUBLICATIONS

G. Baoquan, "Time-domain analysis and research on blasting vibration signals based on Fourier transform," Proceedings of 2011 International Conference on Electronic & Mechanical Engineering and Information Technology, Harbin, China, 2011, pp. 466-469 (Year: 2011).*
P. Borocz and B. Molnar, "Measurement and Analysis of Vibration Levels in Stacked Small Package Shipments in Delivery Vans as a Function of Free Movement Space," Applied Sciences, vol. 10, No. 21, p. 7821, Nov. 2020 (Year: 2020).*

(Continued)

*Primary Examiner* — Sam K Ahn
*Assistant Examiner* — Amneet Singh
(74) *Attorney, Agent, or Firm* — Ingrassia Fisher & Lorenz

(57) ABSTRACT

A data compression method, system, and device for a vibration application can involve applying a Fast Fourier Transform (FFT) to raw vibration data to obtain FFT coefficients, classifying the FFT coefficients as high energy coefficients or low energy coefficients based on predetermined thresholds, quantizing the high energy coefficients using a first quantization and the low energy coefficients using a second quantization as quantized coefficients, and generating an indicator array to identify positions of the high energy coefficients and the low energy coefficients for use in packetizing the positions and the quantized coefficients and recovering lossy raw data from the quantized coefficients for data compression of the raw vibration data. The vibration application can include one or more battery-based internet-of-things (IOT) devices that can generate the raw vibration data. The raw vibration data is transferrable over a wireless communications protocol.

20 Claims, 5 Drawing Sheets

(56) References Cited

U.S. PATENT DOCUMENTS

| | | | |
|---|---|---|---|
| 11,546,193 B2 | 1/2023 | Hu et al. | |
| 11,906,330 B1 | 2/2024 | Narayanaswamy | |
| 11,907,207 B1 | 2/2024 | Bawadhankar et al. | |
| 11,914,862 B2 | 2/2024 | Zamir et al. | |
| 2009/0309725 A1* | 12/2009 | Berger | G08B 13/1663 |
| | | | 702/14 |
| 2016/0335488 A1* | 11/2016 | Nongpiur | G10L 25/18 |
| 2019/0187688 A1 | 6/2019 | Cella et al. | |

FOREIGN PATENT DOCUMENTS

| | | | |
|---|---|---|---|
| EP | 0 768 780 B1 | 5/2003 | |
| KR | 100236526 B1 | 8/1998 | |
| KR | 100335622 B1 | 11/2002 | |

OTHER PUBLICATIONS

Botezatu et al. "Energy-efficient compression algorithm for wireless transmission of physiological data," 2014 18th International Conference on System Theory, Control and Computing (ICSTCC), Sinaia, Romania, 2014, pp. 580-584 (Year: 2014).*

Shawn Whitney and Kevin Krenz, "Vibration Signal PSD for Data Compression," SAND2013-5964C, Sandia National Laboratories, 2015.

Marius Oltean, et al. "Vibration signals compression with Time-Frequency Adaptive Quantization", 978-1-4577-1402-3/11/S26.00, 2011 IEEE.

European Patent Application No. 25170353.4-1218, European Search Report, Aug. 22, 2025.

* cited by examiner

10

20

| Indicator array    22 | High energy coefficients    24 | Low energy coefficients 26 |

30

| # | FFT Size | Compressed Bytes | CR (%) | Energy Loss (%) |
|---|---|---|---|---|
| 1 | 4096 | 142 | 96 | 2.93 |
| 2 | 4096 | 568 | 86 | 0.92 |
| 3 | 4096 | 984 | 75 | 0.42 |
| 4 | 4096 | 1705 | 58 | 0.18 |

40

FAST FOURIER TRANSFORM DATA COMPRESSION FOR VIBRATION APPLICATIONS

TECHNICAL FIELD

Embodiments are generally related to the field of data compression. Embodiments also relate to vibration applications such as sensor transmitters deployed in industrial plants. Embodiments further relate to Faster Fourier Transform (FFT) analysis. Embodiments also relate to data compression for battery powered internet-of-things (IOT) devices.

BACKGROUND

Battery-powered IOT devices used for machine condition monitoring based on vibration or acoustic signals generate large amounts of raw data and Fast Fourier Transform (FFT) analyses at regular intervals. To facilitate visualization and analytics in the host system, this extensive FFT/raw data needs to be transferred over a wireless communication protocol.

FFT is a mathematical algorithm used to analyze the frequency components present in a signal. In the context of battery-powered IoT devices used for machine condition monitoring based on vibration or acoustic signals, FFT analysis is employed to extract meaningful information about the condition of machines or equipment.

The vibration or acoustic signals collected by sensors on the machines are typically in the time domain, meaning they represent the signal's amplitude over time. By applying FFT, these time-domain signals are transformed into the frequency domain, revealing the frequency components present in the signal.

Different machine conditions, such as normal operation, wear and tear, or impending failure, can manifest as specific frequency patterns in the signals. FFT analysis helps extract these frequency components, which can then be analyzed to identify patterns indicative of various machine conditions.

By monitoring changes in the frequency components over time, FFT analysis enables early detection of abnormalities or deviations from normal operation. This proactive approach helps prevent unexpected breakdowns and costly downtime by allowing maintenance to be performed before serious issues arise.

Sending such large amounts of data poses limitations on most low-power, long-range wireless protocols such as Long Range Wide Area Network (LoRaWAN), and it also drains the battery quickly. Achieving long battery life for these types of IoT detectors is challenging due to the power-hungry nature of sensors and wireless communications. To accommodate the need for more data, embedded devices often compromise on transfer rates (e.g., sending data once a day instead of once an hour) or support short-range, low-power communication or only part of spectrum or processed values. This, however, compromises the fault detection capability of analytics on host.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for improved methods and systems for data compression.

It is another aspect of the embodiments to provide for data compression techniques for use with vibration applications in, for example, industrial plants and other settings.

It is also an aspect of the embodiments to provide for an FFT data compression method and system for vibration applications.

The aforementioned aspects and other objectives can now be achieved as described herein. In an embodiment, a data compression method for a vibration application, can involve: applying a Fast Fourier Transform (FFT) to raw vibration data to obtain FFT coefficients, classifying the FFT coefficients as high energy coefficients or low energy coefficients based on predetermined thresholds, quantizing the high energy coefficients using a first quantization and the low energy coefficients using a second quantization as quantized coefficients, and generating an indicator array to identify positions of the high energy coefficients and the low energy coefficients for use in packetizing the positions and the quantized coefficients and recovering lossy raw data from the quantized coefficients for data compression of the raw vibration data.

In an embodiment, the first quantization can comprise an 8-bit quantization and the second quantization can comprise a 3-bit quantization.

An embodiment can further involve packetizing the positions and the quantized coefficients.

An embodiment can also involve performing arithmetic coding on the positions of the quantized coefficients.

An embodiment can additionally involve recovering the lossy raw data from the quantized coefficients.

An embodiment can also involve adjusting a compression ratio based on a signal energy loss for the data compression of the raw vibration data An embodiment can also involve: packetizing the positions and the quantized coefficients, performing arithmetic coding on the positions of the quantized coefficients, recovering the lossy raw data from the quantized coefficients, and adjusting a compression ratio based on a signal energy loss for the data compression of the raw vibration data.

In an embodiment, the vibration application can include one or more battery-based internet-of-things (IOT) devices that can generate the raw vibration data.

In an embodiment, the raw vibration data can be transferred over a wireless communications protocol.

In an embodiment, a system of data compression for a vibration application, can include: at least one processor and a non-transitory computer-usable medium embodying computer program code, the computer-usable medium capable of communicating with the at least one processor, the computer program code including instructions executable by the at least one processor and configured for: applying a Fast Fourier Transform (FFT) to raw vibration data to obtain FFT coefficients, classifying the FFT coefficients as high energy coefficients or low energy coefficients based on predetermined thresholds, quantizing the high energy coefficients using a first quantization and the low energy coefficients using a second quantization as quantized coefficients, and generating an indicator array to identify positions of the high energy coefficients and the low energy coefficients for use in packetizing the positions and the quantized coefficients and recovering lossy raw data from the quantized coefficients for data compression of the raw vibration data.

In an embodiment of the system, the first quantization can comprise an 8-bit quantization and the second quantization can comprise a 3-bit quantization.

In an embodiment of the system, the instructions can be further configured for packetizing the positions and the quantized coefficients.

In an embodiment of the system, the instructions can be further configured for performing arithmetic coding on the positions of the quantized coefficients.

In an embodiment of the system, the instructions can be further configured for recovering the lossy raw data from the quantized coefficients.

In an embodiment of the system, the instructions can be further configured adjusting a compression ratio based on a signal energy loss for the data compression of the raw vibration data In an embodiment of the system, the instructions can be further configured for: packetizing the positions and the quantized coefficients, performing arithmetic coding on the positions of the quantized coefficients, recovering the lossy raw data from the quantized coefficients, and adjusting a compression ratio based on a signal energy loss for the data compression of the raw vibration data.

In an embodiment of the system, the vibration application can comprise one or more battery-based internet-of-things (IOT) device that can generate the raw vibration data.

In an embodiment of the system, the raw vibration data can be transferrable over a wireless communications protocol.

In an embodiment, a sensor can include a vibration application, wherein: a Fast Fourier Transform (FFT) can be applied to raw vibration data to obtain FFT coefficients; the FFT coefficients can be classified as high energy coefficients or low energy coefficients based on predetermined thresholds; the high energy coefficients can be quantized using a first quantization and the low energy coefficients using a second quantization as quantized coefficients; and an indicator array can be generated to identify positions of the high energy coefficients and the low energy coefficients for use in packetizing the positions and the quantized coefficients and recovering lossy raw data from the quantized coefficients for data compression of the raw vibration data.

In an embodiment of the sensor, the vibration application can include one or more battery-based internet-of-things (IOT) devices that can generate the raw vibration data, and the raw vibration data is transferrable over a wireless communications protocol.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

In the drawings described and illustrated herein, identical or similar parts and elements are generally indicated by identical reference numerals.

DETAILED DESCRIPTION

Figures 1, 2:
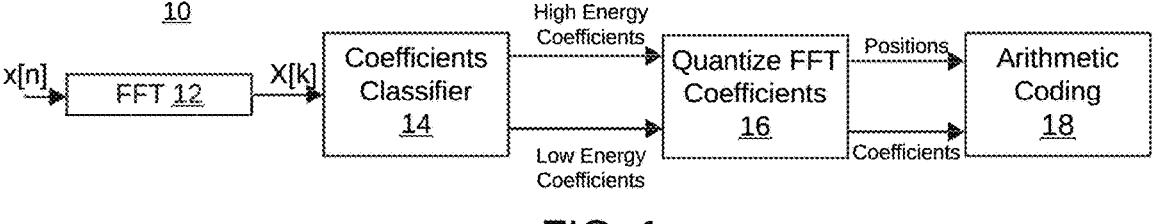
FIG. 1 illustrates a flow-diagram depicting logical operational steps of a data compression method, which can be implemented in accordance with an embodiment.
FIG. 2 illustrates a block diagram depicting packetizing of data over a network including transfer of an indicator array, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the terms "one or more" or "at least one" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets".

Note that as utilized herein, the term Fast Fourier Transform (FFT) can relate to a technique used to compute a Discrete Fourier Transform (DFT) of a sequence, or its inverse (IDFT). An FFT can efficiently computes the DFT and its inverse by dividing the computation into smaller, more manageable sub-problems.

The Discrete Fourier Transform (DFT) is a mathematical transform that converts a sequence of equally spaced samples of a function into a sequence of complex numbers, representing the magnitude and phase of sinusoidal components of different frequencies that make up the original function. An important advantage of the FFT over the direct computation of the DFT is its efficiency. While the direct computation of the DFT requires $O(N^2)$ operations for N samples, the FFT algorithm reduces this complexity to $O(N \log N)$ operations, making it much faster for large sequences. This efficiency makes the FFT particularly valuable in real-time applications and situations where rapid analysis of large data sets may be required.

FIG. 1 illustrates a flow-diagram depicting logical operational steps of a data compression method 10, which can be implemented in accordance with an embodiment. The data compression method 10 shown in FIG. 1 can include an FFT operation, as shown at block 10, which can implement an FFT. The process thus begins with an FFT operation, which computes the Fast Fourier Transform of the input data, specifically acceleration data (x[n]). This operation transforms the time-domain data into the frequency domain, revealing the frequency components present in the signal.

As indicated at block 14, an operation for implementing a coefficient classifier be implemented. In the operation depicted at block 14, FFT coefficients can be classified based on a predetermined energy threshold as high energy coefficients or low energy coefficients. The step or operation indicated at block 14 thus involves classifying the FFT coefficients into high energy coefficients (H) and low energy coefficients (L) based on a predetermined energy threshold $(E_{th})$. This classification is important for identifying significant frequency components (H) that can contribute the most to the signal and less significant components (L).

After classification, the high energy coefficients (H) can be quantized using 8-bit quantization, while the low energy coefficients (L) can be quantized using 3-bit quantization. Quantization is the process of approximating continuous values with a limited set of discrete values, allowing for reduced memory usage and computational complexity. Thus, as shown at block 16, an operation can be implemented to quantize the FFT coefficients. In the operation shown at block 16, the identified high energy FFT components can be quantized using, for example, 8-bit quantization, and the remaining low energy FFT components can be quantized using, for example, 3-bit quantization.

An indicator array (such as shown in FIG. 2) can be used to identify positions of high energy and low energy coefficients. Furthermore, the positions and quantized coefficients can be packetized prior to the performance of arithmetic coding, as shown next at block 18. As indicated at block 18, arithmetic coding can be performed on an indicator array to further compress the data before transmission. Arithmetic coding is a lossless compression technique that can assign variable-length codes to symbols based on their probabilities, resulting in more efficient compression compared to fixed-length coding methods.

Note that an indicator array can be generated to identify the positions of high energy (H) and low energy (L) coefficients. This array is then used to packetize the positions and quantized coefficients for transmission over a network.

Packetization involves encapsulating the data into packets, which can be efficiently transmitted over the network.

It should be appreciated that quantization is a process of approximating continuous values with a limited set of discrete values. In the context of quantizing Fast Fourier Transform (FFT) components, 3-bit quantization and 4-bit quantization can relate to the number of bits used to represent each component of the FFT output. In 3-bit quantization, for example, each component of the FFT output can be represented using only 3-bits. This means that the continuous range of values produced by the FFT is divided into a limited number of discrete levels, and each level is represented by a unique binary code using 3-bits. The smaller number of bits allows for a coarser representation of the FFT components, leading to a lower precision but also reduced memory and computational requirements.

Similarly, in 4-bit quantization, each component of the FFT output is represented using 4 bits. This provides slightly higher precision compared to 3-bit quantization, as there are more discrete levels available to represent the FFT components. However, it also requires more memory and computational resources compared to 3-bit quantization. Both 3-bit and 4-bit quantization techniques can be used in situations where precision can be traded off for reduced memory usage and computational complexity, such as in embedded systems or applications where real-time processing may be important. However, the choice between 3-bit and 4-bit quantization may depend on the specific requirements of the application and the acceptable level of precision loss.

It should be appreciated that the operations shown in FIG. 1 can be summarized as follows. First, an operation can be implemented to send the threshold energy $(E_{th})$. Then, an operation can be implemented to compute FFT coefficients for, for example, the acceleration, followed by sorting in order of their amplitude, as indicated by the following:

$$X(k) = FFT(x[n], N),$$

where x[n] is acceleration data and N is fft size.

An operation can be them implemented to sort FFT coefficients and pick all the high energy coefficients as follows:

$$X_s = \text{sort}(X)$$

$$\min_R \sum_{k=0}^{R-1} |X_s(k)|^2 \geq E_{th},$$

let us call this set of coefficients as H.

L=The set of FFT coefficients that are not in H.

Next, the set H can be quantized using an 8-bit quantizer, and L can be quantized with a 3-bit quantizer. An indicator variable can be then used to indicate if an index of coefficient belongs to H or L, as follows:

```
for (index=0;index ≤ N / 2 ; index++)
    if(X(index) ∈ H)
        indicator(index)=1
    else
        indicator(index)=0
```

Thereafter, arithmetic coding can be performed on the indicator array the data packetized for transfer over, for example, LoRa. Note that "LoRa," short for Long Range, relates to a wireless communication technology that can enable long-range communication with low power consumption. It is particularly well-suited for Internet of Things (IoT) and Machine-to-Machine (M2M) applications where devices need to communicate over long distances while conserving battery power. LoRa devices can be designed to operate on low power, making them suitable for battery-powered applications.

FIG. 2 illustrates a block diagram depicting a system 20 that can packetize data over a network including transfer of an indicator array 22, in accordance with an embodiment. The transfer of the indicator array 22 and the previously discussed high energy coefficients is critical, including the use of retransmission for any lost packets. The indicator array 22 shown in FIG. 2 is associated with high energy coefficients 24 and low energy coefficients 26.

Figures 3, 4:
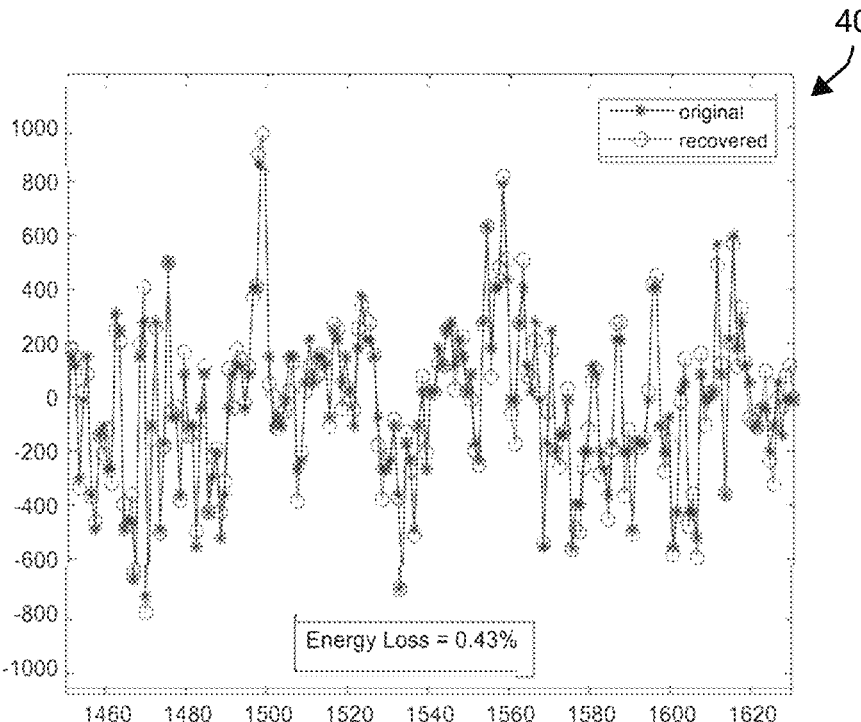
FIG. 3 illustrates a table indicating example compression bytes and a percentage of energy loss with respect to Fast Fourier Transform (FFT) size, in accordance with example embodiments.
FIG. 4 illustrates a graph of energy loss percentage, in accordance with an example embodiment.

FIG. 3 illustrates a table 30 indicating example compression bytes and a percentage of energy loss with respect to Fast Fourier Transform (FFT) size, in accordance with example embodiments. The table 30 shown in FIG. 3 includes three columns specifically a column tracking FFT size, an adjacent column tracking compressed bytes, another column tracking CR (%), and finally a column indicating energy loss (percentage).

The table 30 shown in FIG. 3 illustrates example compression bytes and the percentage of energy loss concerning different Fast Fourier Transform (FFT) sizes. The thus table includes the following four columns:

FFT size: This column tracks the size of the FFT used in the compression process.

Compressed bytes: Indicates the number of bytes required to represent the compressed data.

CR (%): Represents the compression ratio, calculated as the ratio of uncompressed bytes to compressed bytes, expressed as a percentage.

Energy loss (percentage): Indicates the percentage of energy lost during the compression process compared to the original FFT data. This provides insight into the trade-off between compression efficiency and the fidelity of the reconstructed data.

FIG. 4 illustrates an example graph 40 of compression data. Graph 40 shows the original signal vs decompressed signal. FIG. 4 demonstrates the recovery of original signal after performing indicator array decoding, which uses arithmetic decoding to recover the indicator array Further quantized FFT data is recovered by the use of the indicator array to position the high energy coefficients and the low energy coefficients at corresponding indices. The graph 40 of FIG. 4 shows recovered data after an inverse FFT is performed.

In the process of decoding, the indicator array is crucial for distinguishing between high energy and low energy coefficients during data recovery. This also highlights the recovery of quantized FFT data, which involves using the indicator array to position the high energy coefficients and low energy coefficients at corresponding indices. This step is essential for reconstructing the original FFT data accurately.

FIG. 3 and FIG. 4 indicate the performance of an inverse FFT as part of the data recovery process. The inverse FFT reverses the transformation performed during the compression phase, allowing for the reconstruction of the original FFT data from the compressed representation. Overall, FIG. 3 and FIG. 4 provide insights into the decoding process of the indicator array, the recovery of quantized FFT data, and the trade-offs between compression efficiency and energy loss in the context of FFT-based compression techniques. Such visualizations and data tables may be useful in understanding the performance characteristics of the compression method discussed herein and optimizing parameters for specific applications.

Figure 5A:
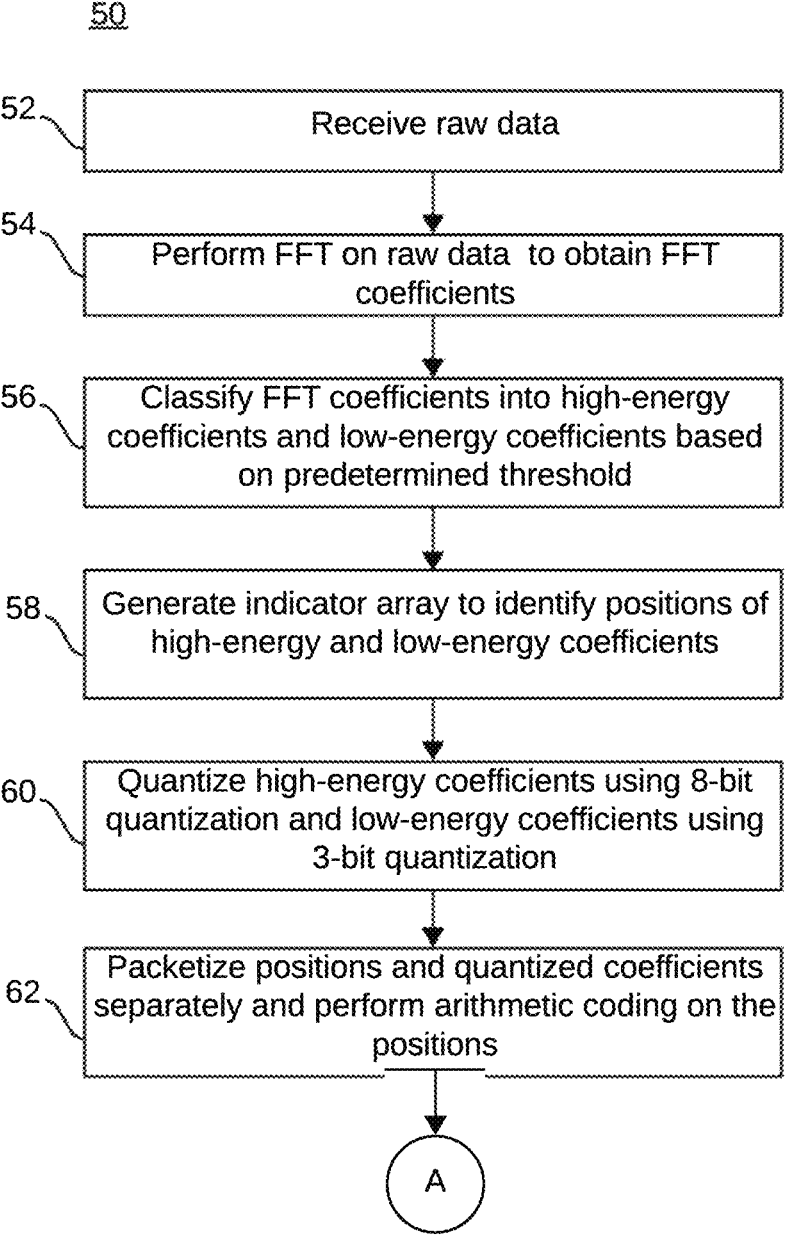
FIG. 5A and FIG. 5B illustrates a flow chart of operations depicting logical operational steps of a data compression method, which can be implemented in accordance with an alternative embodiment.
Figure 5B:
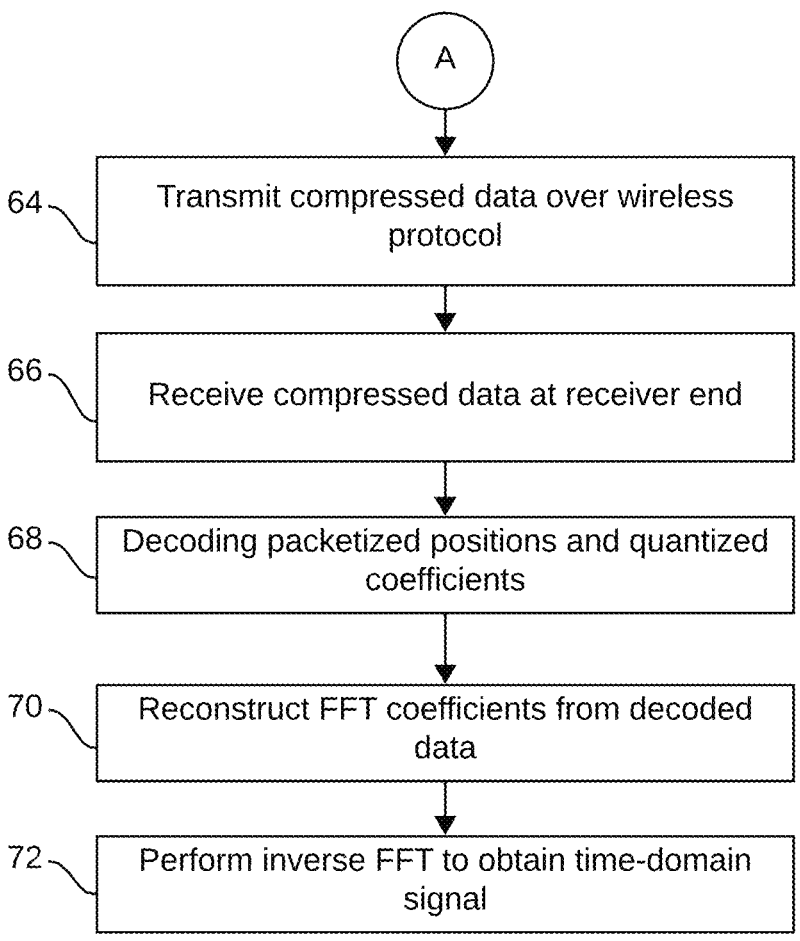

FIG. 5A and FIG. B illustrates a flow chart of operations depicting logical operational steps of a data compression method 50, which can be implemented in accordance with an alternative embodiment. Note that the data compression method 50 shown in FIG. 5A and FIG. 5B illustrates an alternative embodiment of the data compression method 10 depicted in FIG. 1. The data compression method 50 shown in FIG. 5A and FIG. 5B can use FFT in conjunction with adaptive quantization and packetization for transmission over low-power long wireless protocols.

As shown at block 52, a step or operation can be implemented involving the receipt of raw data (e.g., raw vibration data). Next, as depicted at block 54, a step or operation can be implemented, which involves performing FFT on the raw data to obtain FFT coefficients. Then, as shown at block 56, a step or operation can be implemented to classify FFT coefficients into high-energy and low-energy categories based on a predetermined threshold. Thereafter, as shown at block 58, a step or operation can be implemented to generate indicator array to identify positions of high-energy and low-energy coefficients.

Next, as indicated at block 60, a step or operation can be implemented to quantize high-energy coefficients using 8-bit quantization and low-energy coefficients using 3-bit quantization. As illustrated at block 62, a step or operation can be implemented involving packetizing positions and quantized coefficients and performing arithmetic coding on the positions. Then, as shown at block 64, a step or operation can be implemented to transmit the compressed data over a wireless protocol (e.g., a low-power long wireless protocol or another type of wireless protocol). As depicted at block 66, a step or operation can be implemented involving receiving the compressed data at a receiver end.

Next, as indicated at block 68, a step or operation can be implemented involving decoding the packetized positions and quantized coefficients. As shown next at block 70, a step or operation can be implemented to reconstruct the FFT coefficients from the decoded data. Then, as illustrated at block 72, a step or operation can be implemented to perform an inverse FFT to obtain the time-domain signal.

The disclosed data compression method enables several advantages in condition monitoring and faults detection, including overcoming communication bandwidth limitations, and improving device battery life and cost, in industrial plant equipment. For example, by implementing FFT analysis with respect to sensor data (e.g., raw vibration data), abnormal frequency patterns indicative of machine faults or anomalies can be identified.

The compression and transmission of FFT data over long-range communication networks, such as LoRa, can enable real-time monitoring of equipment health, allowing for early detection of potential issues before they escalate into more significant problems. Early detection of machine faults can prevent costly downtime, reduce maintenance costs, and extend the lifespan of equipment.

The embodiments can be used to reduce the amount of data that may need to be transmitted over a network, overcoming limitations associated with short-range communication due to heavy data transfer needs. By quantizing FFT coefficients and transmitting only the essential information using efficient compression algorithms, the embodiments can minimize bandwidth requirements, allowing for reliable long-range communication even in environments with limited network coverage.

Furthermore, reduced data transmission requirements can lead to lower energy consumption, thereby extending device battery life. Transmitting compressed FFT data over low-power networks like LoRa reduces the energy overhead associated with data transmission. Lower energy consumption translates to reduced battery replacement frequency and lower operating costs over the lifespan of the device, making it more cost-effective for long-term deployments.

In transmitter solutions deployed around industrial plant equipment to detect leakages, FFT analysis can identify characteristic frequency signatures associated with leaks or abnormal vibrations. The use of FFT data compression allows for efficient transmission of relevant data over long distances to a central monitoring system, enabling real-time detection and localization of leaks. By reducing the energy consumption of individual devices through efficient data compression and transmission, the overall cost of deploying and maintaining a large number of transmitter devices is significantly reduced.

The disclosed FFT data compression approach offers a comprehensive solution for early fault detection, long-range communication, improved device efficiency, and cost-effective transmitter solutions in industrial applications. By leveraging advanced signal processing techniques and efficient data compression algorithms, it addresses key challenges faced in IoT deployments, enabling smarter and more reliable monitoring of industrial equipment.

Figure 6:
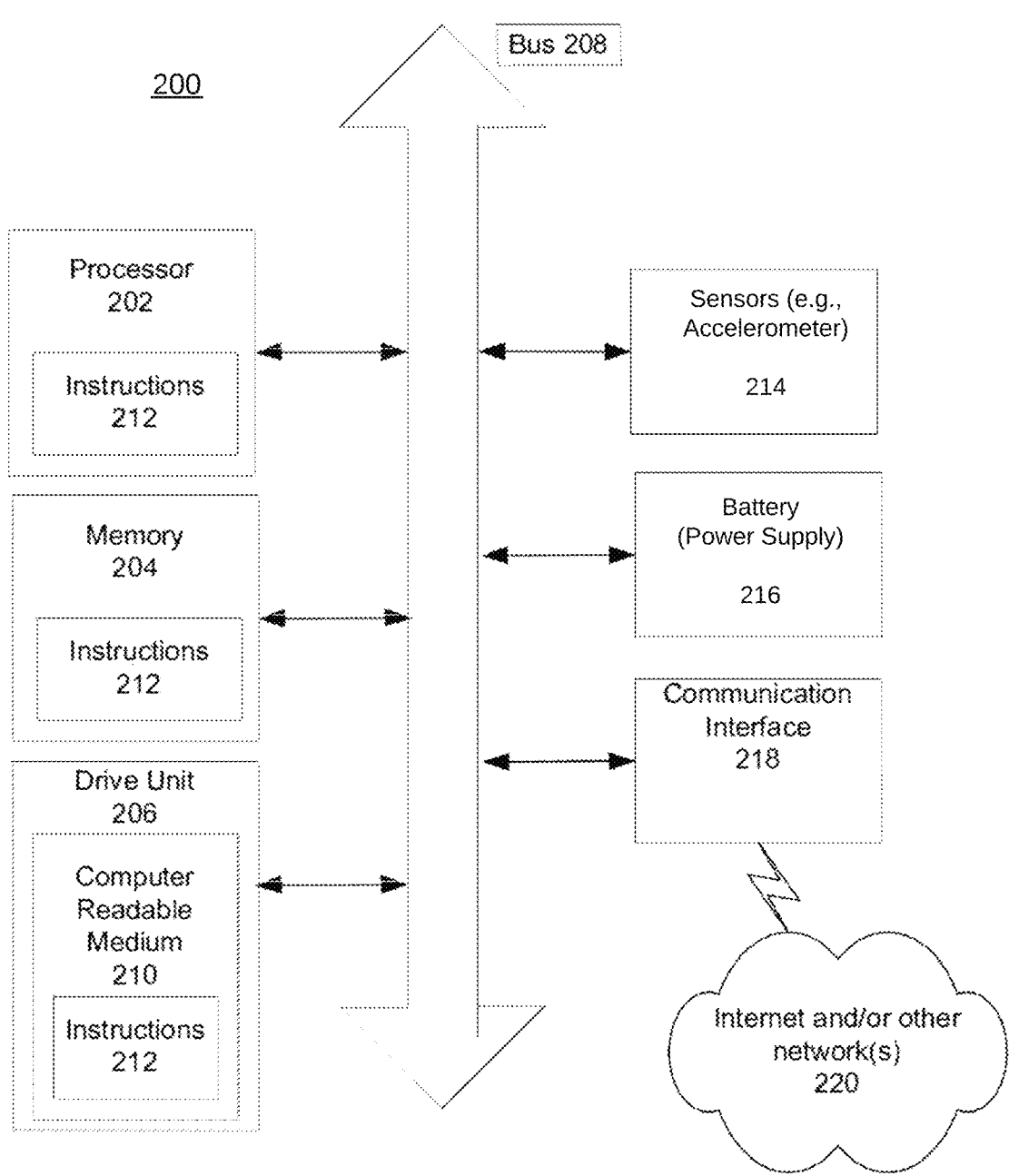
FIG. 6 illustrates a block diagram depicting a computer system, which may be adapted for use in accordance with an embodiment.

Referring now to FIG. 6, an illustrative embodiment of a computer system 200 is shown. The computer system 200 can include a set of instructions that can be executed to cause the computer system 200 to perform any one or more of the methods or computer-based functions disclosed herein, or aspects of the disclosed embodiments. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement the disclosed data compression method and related aspects, of which the disclosed embodiments can be a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 6, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 200 may further communicate with one or more sensors such as sensor 214 (e.g., accelerometer and/or other types of sensors/transmitters). The sensor 214 may communicate with the processor 202, and/or with the software stored in the memory 204 or in the drive unit 206. Additionally, the computer system 200 may communicate with a battery (power supply) device 216.

In a particular embodiment, as depicted in FIG. 6, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions.

The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture.

The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The flow charts and block diagrams in the figures illustrate the architecture, functionality, and operation of possible implementations of systems, methods, and computer program products according to various embodiments (e.g., preferred or alternative embodiments). In this regard, each block in the flow charts or block diagrams depicted and described herein can represent a module, segment, or portion of instructions, which can comprise one or more executable instructions for implementing the specified logical function (s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that can perform the specified functions or acts or carry out combinations of special purpose hardware and computer instructions.

Based on the foregoing, it can be appreciated that a number of embodiments including preferred and alternative embodiments are disclosed herein. For example, in an embodiment, a data compression method for a vibration application can involve: applying a Fast Fourier Transform (FFT) to raw vibration data to obtain FFT coefficients; classifying the FFT coefficients as high energy coefficients or low energy coefficients based on predetermined thresholds; quantizing the high energy coefficients using a first quantization and the low energy coefficients using a second quantization as quantized coefficients; and generating an indicator array to identify positions of the high energy coefficients and the low energy coefficients for use in packetizing the positions and the quantized coefficients and recovering lossy raw data from the quantized coefficients for data compression of the raw vibration data.

In an embodiment of the data compression method, the first quantization can comprise an 8-bit quantization and the second quantization comprises a 3-bit quantization.

An embodiment of the data compression method can further involve packetizing the positions and the quantized coefficients.

An embodiment of the data compression method can further involve performing arithmetic coding on the positions of the quantized coefficients.

An embodiment of the data compression method can further involve recovering the lossy raw data from the quantized coefficients.

An embodiment of the data compression method can further involve adjusting a compression ratio based on a signal energy loss for the data compression of the raw vibration data.

In an embodiment of the data compression method, the vibration application can comprise one or more battery-based internet-of-things (IOT) devices that can generate the raw vibration data.

In an embodiment of the data compression method, the raw vibration data can be transferred over a wireless communications protocol.

In another embodiment, a system for data compression for a vibration application, can include at least one processor, and a non-transitory computer-usable medium embodying computer program code, the computer-usable medium capable of communicating with the at least one processor, the computer program code comprising instructions executable by the at least one processor and configured for: applying a Fast Fourier Transform (FFT) to raw vibration data to obtain FFT coefficients; classifying the FFT coefficients as high energy coefficients or low energy coefficients based on predetermined thresholds; quantizing the high energy coefficients using a first quantization and the low energy coefficients using a second quantization as quantized coefficients; and generating an indicator array to identify positions of the high energy coefficients and the low energy coefficients for use in packetizing the positions and the quantized coefficients and recovering lossy raw data from the quantized coefficients for data compression of the raw vibration data.

In an embodiment of the system, the first quantization can comprise an 8-bit quantization and the second quantization can comprise a 3-bit quantization.

In an embodiment of the system, the instructions can be further configured for packetizing the positions and the quantized coefficients.

In an embodiment of the system, the instructions can be further configured for performing arithmetic coding on the positions of the quantized coefficients.

In an embodiment of the system, the instructions can be further configured for recovering the lossy raw data from the quantized coefficients.

In an embodiment of the system, the instructions can be further configured for adjusting a compression ratio based on a signal energy loss for the data compression of the raw vibration data.

In an embodiment of the system, vibration application can comprise one or more battery-based internet-of-things (IOT) devices that can generate the raw vibration data.

In an embodiment of the system, the raw vibration data is transferrable over a wireless communications protocol.

In another embodiment, a sensor can be include a vibration application, wherein: a Fast Fourier Transform (FFT) can be applied to raw vibration data to obtain FFT coefficients; the FFT coefficients can be classified as high energy coefficients or low energy coefficients based on predetermined thresholds; the high energy coefficients can be quantized using a first quantization and the low energy coefficients using a second quantization as quantized coefficients; and an indicator array can be generated to identify positions of the high energy coefficients and the low energy coefficients for use in packetizing the positions and the quantized coefficients and recovering lossy raw data from the quantized coefficients for data compression of the raw vibration data.

In an embodiment of the sensor, the vibration application can comprise at least one battery-based internet-of-things (IOT) device that can generate the raw vibration data; and the raw vibration data is transferrable over a wireless communications protocol.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A data compression method for a vibration application, comprising:
    applying a Fast Fourier Transform (FFT) to raw vibration data to obtain FFT coefficients;
    classifying the FFT coefficients as high energy coefficients or low energy coefficients based on predetermined thresholds;
    quantizing the high energy coefficients using a first quantization and the low energy coefficients using a second quantization as quantized coefficients; and
    generating an indicator array to identify positions of the high energy coefficients and the low energy coefficients for use in packetizing the positions and the quantized coefficients and recovering lossy raw data from the quantized coefficients for data compression of the raw vibration data.

2. The data compression method of claim 1 wherein the first quantization comprises an 8-bit quantization and the second quantization comprises a 3-bit quantization.

3. The data compression method of claim 1 further comprising packetizing the positions and the quantized coefficients.

4. The data compression method of claim 1 further comprising performing arithmetic coding on the positions of the quantized coefficients.

5. The data compression method of claim 1 further comprising recovering the lossy raw data from the quantized coefficients.

6. The data compression method of claim 1 further comprising adjusting a compression ratio based on a signal energy loss for the data compression of the raw vibration data.

7. The data compression method of claim 1 further comprising:
    packetizing the positions and the quantized coefficients;
    performing arithmetic coding on the positions of the quantized coefficients;
    recovering the lossy raw data from the quantized coefficients; and
    adjusting a compression ratio based on a signal energy loss for the data compression of the raw vibration data.

8. The data compression method of claim 1 wherein the vibration application comprises at least one battery-based internet-of-things (IOT) device that generates the raw vibration data.

9. The data compression method of claim 1 wherein the raw vibration data is transferrable over a wireless communications protocol.

10. A system for data compression for a vibration application, comprising:

at least one processor; and a non-transitory computer-usable medium embodying computer program code, the non-transitory computer-usable medium capable of communicating with the at least one processor, the computer program code comprising instructions executable by the at least one processor and configured for:

applying a Fast Fourier Transform (FFT) to raw vibration data to obtain FFT coefficients;

classifying the FFT coefficients as high energy coefficients or low energy coefficients based on predetermined thresholds;

quantizing the high energy coefficients using a first quantization and the low energy coefficients using a second quantization as quantized coefficients; and generating an indicator array to identify positions of the high energy coefficients and the low energy coefficients for use in packetizing the positions and the quantized coefficients and recovering lossy raw data from the quantized coefficients for data compression of the raw vibration data.

11. The system of claim 10 wherein the first quantization comprises an 8-bit quantization and the second quantization comprises a 3-bit quantization.

12. The system of claim 10 wherein the instructions are further configured for packetizing the positions and the quantized coefficients.

13. The system of claim 10 wherein the instructions are further configured for performing arithmetic coding on the positions of the quantized coefficients.

14. The system of claim 10 wherein the instructions are further configured for recovering the lossy raw data from the quantized coefficients.

15. The system of claim 10 wherein the instructions are further configured for adjusting a compression ratio based on a signal energy loss for the data compression of the raw vibration data.

16. The system of claim 10 wherein the instructions are further configured for:

packetizing the positions and the quantized coefficients;

performing arithmetic coding on the positions of the quantized coefficients;

recovering the lossy raw data from the quantized coefficients; and adjusting a compression ratio based on a signal energy loss for the data compression of the raw vibration data.

17. The system of claim 10 wherein the vibration application comprises at least one battery-based internet-of-things (IOT) device that generates the raw vibration data.

18. The system of claim 10 wherein the raw vibration data is transferrable over a wireless communications protocol.

19. A sensor, comprising:

a vibration application, wherein:

a Fast Fourier Transform (FFT) is applied to raw vibration data to obtain FFT coefficients;

the FFT coefficients are classified as high energy coefficients or low energy coefficients based on predetermined thresholds;

the high energy coefficients are quantized using a first quantization and the low energy coefficients using a second quantization as quantized coefficients; and an indicator array is generated to identify positions of the high energy coefficients and the low energy coefficients for use in packetizing the positions and the quantized coefficients and recovering lossy raw data from the quantized coefficients for data compression of the raw vibration data.

20. The sensor of claim 19 wherein:

the vibration application comprises at least one battery-based internet-of-things (IOT) device that generates the raw vibration data; and the raw vibration data is transferrable over a wireless communications protocol.

\* \* \* \* \*